(12) United States Patent
Nitta et al.

(10) Patent No.: US 6,198,622 B1
(45) Date of Patent: Mar. 6, 2001

(54) ELECTROCHEMICAL DEVICE

(75) Inventors: Yukihiro Nitta, Uji; Hiroyuki Matsuura, Kyoto; Yuichiro Tsubaki, Uji; Katsuji Shiono, Otsu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/249,152

(22) Filed: Feb. 12, 1999

(30) Foreign Application Priority Data

Mar. 17, 1998 (JP) .................................................. 10-066527

(51) Int. Cl.$^7$ ................................. H01G 9/00; H01G 9/02
(52) U.S. Cl. ......................... 361/504; 361/517; 361/525; 361/535
(58) Field of Search ..................................... 361/503–504, 361/511, 512, 517–519, 525, 530, 534–538; 252/62.2

(56) References Cited

U.S. PATENT DOCUMENTS 4,294,732  10/1981  Ohvachi et al. .

FOREIGN PATENT DOCUMENTS

| 0 684 620 | * 11/1995 | (EP) . |
| 3-6646 | 6/1987 | (JP) . |
| 3-8092 | 6/1987 | (JP) . |
| 62-276819 | * 12/1987 | (JP) . |
| WO 95/15572 | 6/1995 | (WO) . |

* cited by examiner

*Primary Examiner*—Anthony Dinkins
(74) *Attorney, Agent, or Firm*—Ratner & Prestia (57) ABSTRACT

An electrochemical device of the present invention includes: a main body formed by rolling up an anode foil, a cathode foil and a separator disposed therebetween, each of the anode foil and the cathode foil having a lead wire connected thereto, wherein the main body is impregnated with an electrolytic solution; a tubular case having a bottom surface for accommodating the main body; and a seal for sealing an opening of the tubular case, which includes a through hole for the lead wire to pass therethrough. The electrolytic solution contains about 5 to about 100 parts by weight of a quaternary salt of a compound having an alkyl-substituted amidine group as an electrolyte with respect to 100 parts by weight of an organic solvent containing at least one of γ-butyrolactone and propylene carbonate. The seal is an elastic body containing a butyl rubber polymer which is a copolymer of isobutylene and isoprene, and an alkylphenol formalin resin as a vulcanizing agent. At least a portion of the seal has a hardness of about 75 International Rubber Hardness Degrees.

3 Claims, 2 Drawing Sheets

FIG.1

PRIOR ART

FIG.2

ELECTROCHEMICAL DEVICE

BACKGROUND OF THE INVENTION

1. Field of the Invention

The present invention relates to an electrochemical device for use with various electronic devices. Particularly, the present invention relates to an electrochemical device in which compositions for use in an electrolytic solution and a seal are improved.

2. Description of the Related Art

Known electrochemical devices which require an electrolytic solution in order to drive such devices include an aluminum electrolytic capacitor, an electric double layer capacitor, a lithium battery, a lithium ion battery and an electrochromic device.

Figure 2:
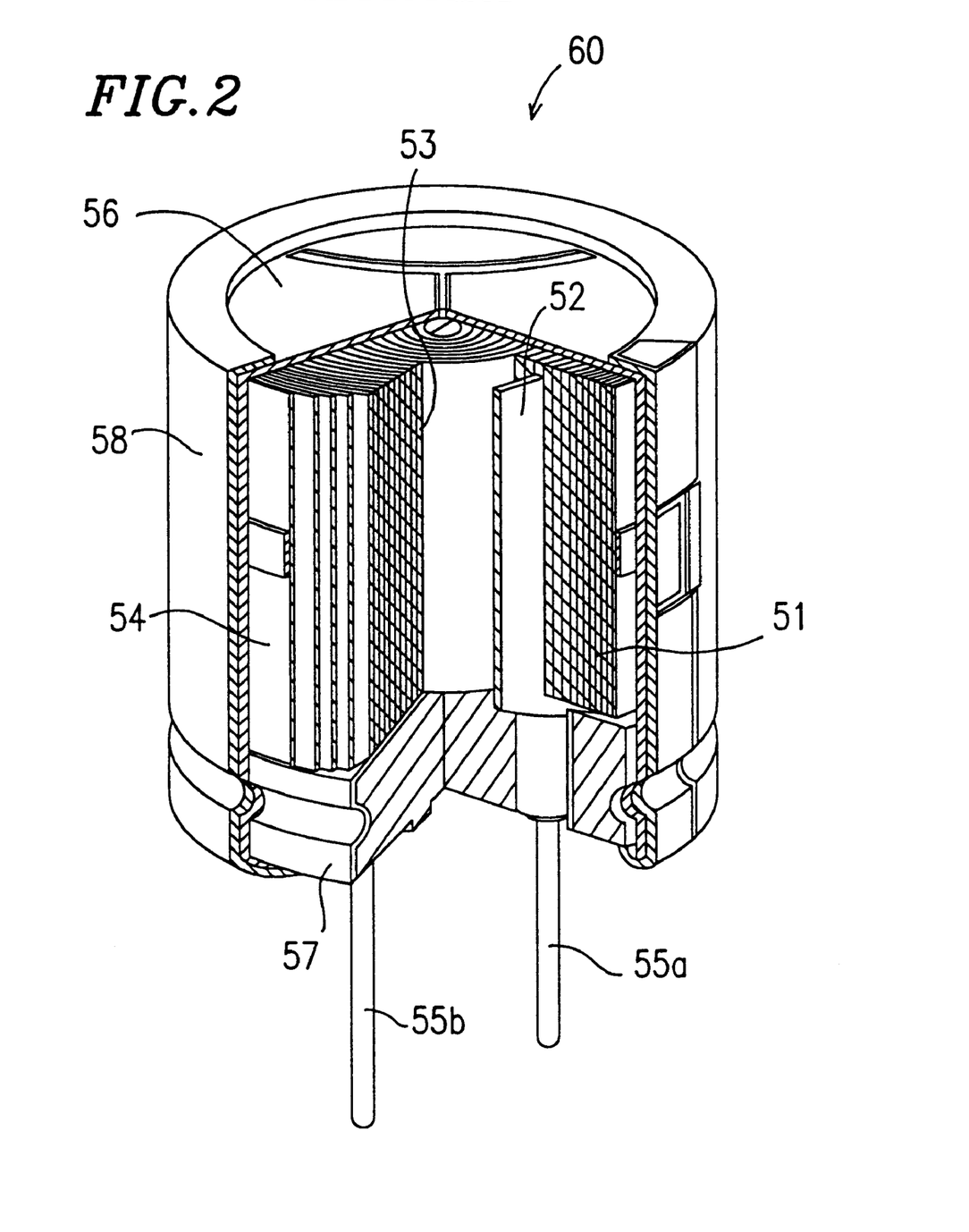
FIG. 2 is a partially cutaway view illustrating a conventional electrochemical device.

Referring to FIG. 2, a conventional aluminum electrolytic capacitor 60 will now be described as an exemplary electrochemical device. The aluminum electrolytic capacitor 60 includes: a capacitor element 51 as a main body; an electrolytic solution (not shown) which is impregnated in the capacitor element 51; a tubular metallic case 56 made of aluminum which has a bottom surface and accommodates the capacitor element 51; a seal 57 for sealing an opening of the case 56; and a cover 58 for covering the case 56.

The capacitor element 51 is formed by rolling up an anode foil 52, a cathode foil 53 and a separator 54 disposed between these foils. A pair of lead wires 55a and 55b are coupled to the anode foil 52 and the cathode foil 53, respectively. The lead wires 55a and 55b each include a rod-like terminal section and a solderable lead section for external connection. The terminal section includes a flat surface which is in contact with the anode foil 52 or the cathode foil 53.

An electrolytic solution used in such an aluminum electrolytic capacitor includes one which is obtained by dissolving an electrolyte such as an organic acid, an inorganic acid and salts thereof in a solvent such as γ-butyrolactone or N,N-dimethylformamide. For example, those using a quaternary ammonium salt of a maleic acid or a citraconic acid (Japanese Patent Publication for Opposition No. 3-6646) and those using a quaternary ammonium salt of an aromatic carboxylic acid (Japanese Patent Publication for Opposition No. 3-8092) are known in the art.

As the seal material, an ethylene propylene copolymer and a butyl rubber, which are vulcanized with sulfur, are used. Known seal materials with improved heat stability include a butyl rubber which is vulcanized with an alkylphenol formalin resin (Japanese Laid-open Publication No. 62-276819).

As another exemplary electrochemical device, a conventional electric double layer capacitor will now be described. The electric double layer capacitor has a structure which is similar to that of the aluminum electrolytic capacitor illustrated in FIG. 2. An electrolytic solution used in such an electric double layer capacitor includes one which is obtained by dissolving an electrolyte such as an inorganic acid salt in an organic solvent such as propylene carbonate. For example, as an inorganic acid salt, a quaternary ammonium salt of perchloric acid or tetrafluoroboric acid are known in the art.

However, in such a conventional electrochemical device including the above aluminum electrolytic capacitor and the electric double layer capacitor, when a voltage, particularly a reverse voltage, is applied to the electrochemical device, an excessive amount of hydroxide ions may be generated by the electrolysis of the electrolytic solution. When such an electrochemical device is used for a long time under high temperature conditions, particularly, high temperature and high humidity conditions, the electrolytic solution often leaks through the seal. This leakage is due to an increase in the internal pressure of the electrochemical device and deterioration of the seal by the alkalinity of hydroxide ions.

In order to address such leakage problems, a seal made of a butyl rubber obtained by vulcanization with an alkylphenol formalin resin, vulcanization with a resin, or the like, has been proposed. Such a seal is generally more resistant to the deterioration by alkalis. The leakage of the electrolytic solution due to the excessive hydroxide ions is particularly suppressed when such a seal is used in combination with an electrolytic solution containing, as an electrolyte, a quaternary salt of a compound having an alkyl-substituted amidine group (see WO 95/15572).

However, such a combination is still insufficient for eliminating leakage during long-term use of an electrochemical device under high temperature conditions, particularly, high temperature and high humidity condition. Thus, it is desired to obtain seals having more reliable sealing properties.

SUMMARY OF THE INVENTION

According to one aspect of this invention, an electrochemical device includes: a main body formed by rolling up an anode foil, a cathode foil and a separator disposed therebetween, each of the anode foil and the cathode foil having a lead wire connected thereto, wherein the main body is impregnated with an electrolytic solution; a tubular case having a bottom surface for accommodating the main body; and a seal for sealing an opening of the tubular case, which includes a through hole for the lead wire to pass therethrough. The electrolytic solution contains about 5 to about 100 parts by weight of a quaternary salt of a compound having an alkyl-substituted amidine group as an electrolyte with respect to 100 parts by weight of an organic solvent containing at least one of γ-butyrolactone and propylene carbonate. The seal is an elastic body containing a butyl rubber polymer which is a copolymer of isobutylene and isoprene, and an alkylphenol formalin resin as a vulcanizing agent. At least a portion of the seal has a hardness of about 75 International Rubber Hardness Degrees.

In accordance with the present invention, the electrolytic solution contains an organic solvent containing γ-butyrolactone and/or propylene carbonate and a quaternary salt of a compound having an alkyl-substituted amidine group as an electrolyte. This compound is quaternarized (i.e., converted into a quaternary salt) by introducing an alkyl substituent on the amidine group, which has a basic skeleton represented by N–C=N. In such an electrolytic solution, even when hydroxide ions are generated by an electrolytic reaction, such hydroxide ions are quickly consumed in a reaction involving the N–C=N skeleton of the alkyl-substituted amidine group. Such consumption of the hydroxide ions may be expressed by the following general scheme:

-continued

Thus, when a quaternary salt of a compound having an alkyl-substituted amidine group is used as an electrolyte, instead of a quaternary ammonium salt, it is possible to suppress the increase in the internal pressure and the deterioration of the seal by alkalis. As a result, it is possible to improve the sealing property of the electrochemical device.

Moreover, in accordance with the present invention, a butyl rubber vulcanized with an alkylphenol formalin resin is used as the seal material. Such a butyl rubber is superior in heat stability and alkali resistance. As compared with seals formed by a butyl rubber vulcanized with sulfur, the sealing force (i.e., rubber elasticity) of the seal of the present invention is less likely to deteriorate even when the electrochemical device is used for an extended period of time under high temperature conditions, particularly, high temperature and high humidity conditions. Thus, a long-term stable sealing property can be obtained. As a result, it is possible to suppress the leakage of an electrolytic solution through the seal due to the increase in the internal pressure and the deterioration of the seal by alkalis.

Furthermore, in accordance with the present invention, at least a portion of the seal has a hardness of about 75 IRHD ("International Rubber Hardness Degrees", hereinafter referred to simply as "IRHD") or greater. Therefore, it is possible to maintain a strong sealing force which sufficiently compresses the lead wires passing through the holes provided in the seal. Thus, an even more stable sealing property can be obtained, in addition to the decreased deterioration of the sealing force owing to the use of the butyl rubber vulcanized with an alkylphenol formalin resin. As a result, it is possible to further suppress leakage of an electrolytic solution through the seal.

Due to the above-described effects of the present invention, it is possible to reduce the influence of the electrolytic reaction of the electrolytic solution in the electrochemical device, while maintaining a good sealing property under high temperature conditions, particularly, high temperature and high humidity conditions.

In one preferred embodiment of the invention, the quaternary salt is selected from the group consisting of an alicyclic amidine compound, an imidazole compound and a benzimidazole compound, which are substituted with one or more alkyl or arylalkyl groups and quaternarized.

In such a compound, a ring-opening decomposition of the alkyl-substituted amidine group with hydroxide ions proceeds at a relatively high reaction rate. Therefore, when used as an electrolyte, the compound quickly consumes the hydroxide ions generated by the electrolytic reaction in the electrolytic solution. As a result, it is possible to further improve the sealing property of the electrochemical device for preventing leakage of an electrolytic solution.

In one preferred embodiment of the invention, the quaternary salt is selected from the group consisting of 8-methyl-1,8-diazabicyclo[5,4,0]undec-7-enium, 5-methyl-1,5-diazabicyclo[4,3,0]non-5-enium, 1,2,3-trimethyl-imidazolinium, 1,2,3,4-tetramethylimidazolinium, 1,2-dimethyl-3-ethylimidazolinium, 1,3,4-trimethyl-2-ethyl-imidazolinium, 1,3-dimethyl-2-heptylimidazolinium, 1,3-dimethyl-2-(1'-ethylpentyl)imidazolinium, 1,3-dimethyl-2-dodecylimidazolinium, 1,2,3-trimethyl-1,4,5,6-tetrahydro-pyrimidinium, 1,3-dimethylimidazolium, 1-methyl-3-ethyl-imidazolium and 1,3-dimethylbenzimidazolium.

When such a compound is used as an electrolyte, the conductivity of the electrolytic solution is improved. Therefore, it is possible to provide an electrochemical device having a low impedance, while preventing leakage of the electrolytic solution even under high temperature conditions, particularly, high temperature and high humidity conditions.

Thus, the invention described herein makes possible the advantages of: (1) providing an electrochemical device with reduced influence of an increase in the internal pressure and deterioration of a seal by alkalis due to electrolysis of an electrolytic solution; and (2) providing an electrochemical device with improved stability of the seal under high temperature conditions, particularly, high temperature and high humidity conditions, whereby leakage of an electrolytic solution is effectively prevented.

These and other advantages of the present invention will become apparent to those skilled in the art upon reading and understanding the following detailed description with reference to the accompanying figures.

DESCRIPTION OF THE PREFERRED EMBODIMENTS

Preferred embodiments of the present invention will now be described.

Figure 1:
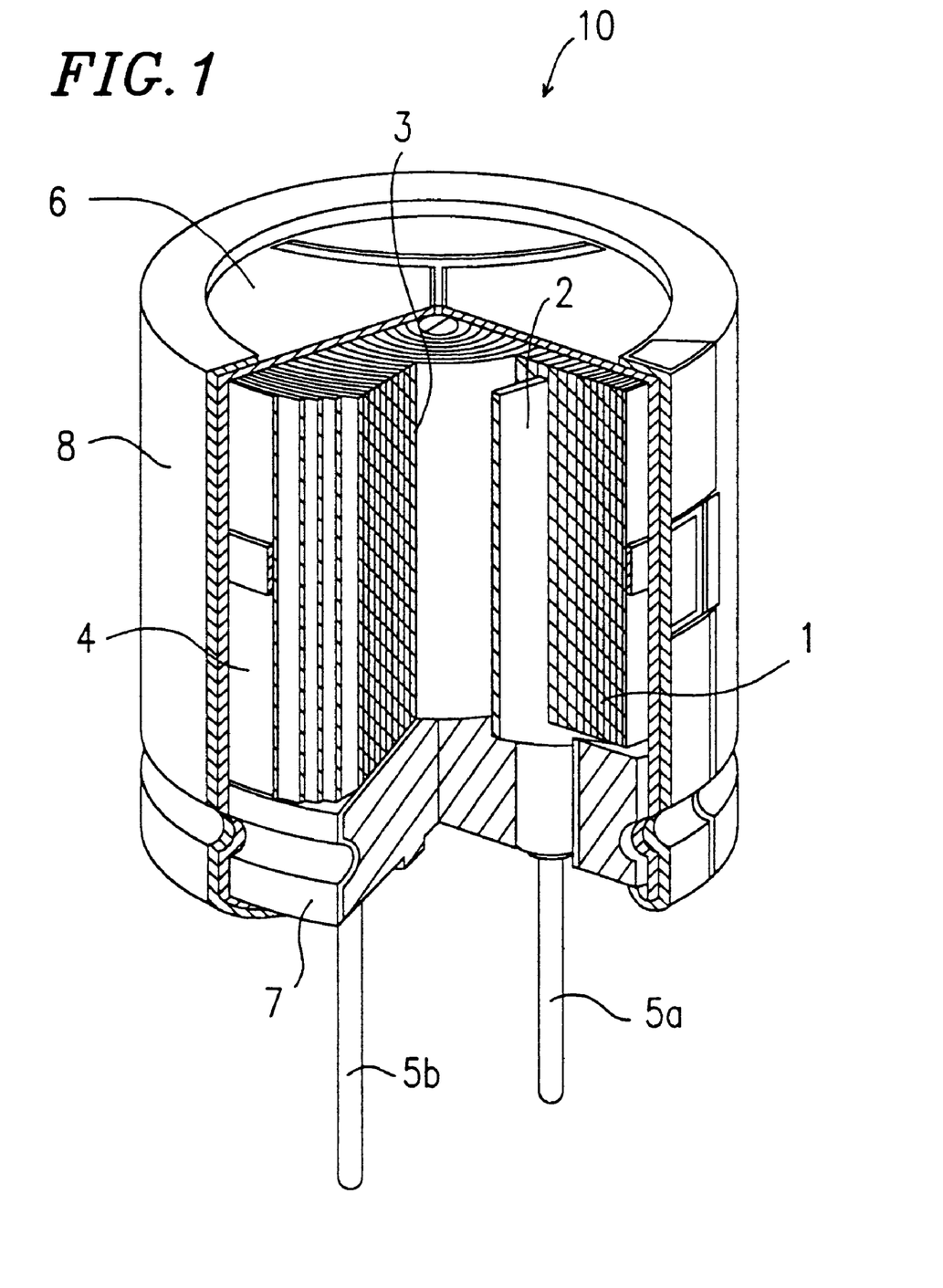
FIG. 1 is a partially cutaway view illustrating an electrochemical device according to one embodiment of the present invention.

FIG. 1 is a partially cutaway view illustrating an electrochemical device 10 according to one embodiment of the present invention. The structure of the electrochemical device 10 may be substantially the same as that of the conventional electrochemical device (FIG. 2). Referring to FIG. 1, the electrochemical device 10 includes: a capacitor element 1 as a main body; an electrolytic solution (not shown) which is impregnated in the capacitor element 1; a tubular metallic case 6 made of aluminum, which has a bottom surface and accommodates the capacitor element 1; a seal 7 for sealing an opening of the case 6; and a cover 8 for covering the case 6.

The capacitor element 1 is formed by rolling up an anode foil 2, a cathode foil 3 and a separator 4 disposed between these foils. A pair of lead wires 5a and 5b are coupled to the anode foil 2 and the cathode foil 3, respectively. The lead wires 5a and 5b each include a rod-like terminal section and a solderable lead section for external connection. The terminal section includes a flat surface which is in contact with the anode foil 2 or the cathode foil 3.

An electrolytic solution used in the aluminum electrolytic capacitor of the present invention includes an organic solvent containing γ-butyrolactone and/or propylene carbonate. Preferably, the electrolytic solution contains, as a main solvent, γ-butyrolactone and/or propylene carbonate because these solvents are electrochemically stable.

Any other suitable organic solvent which is compatible with γ-butyrolactone and/or propylene carbonate can be mixed as a sub-solvent in order to improve the low temperature characteristics of the electrochemical device and to improve the discharge voltage.

A sub-solvent which can be preferably used in the present invention includes water, polyhydric alcohols (e.g., ethylene glycol, propylene glycol, diethylene glycol, 1,4-butanediol, glycerin, and polyoxyalkylene polyol), lactones other than γ-butyrolactone (e.g., γ-valerolactone, δ-valerolactone, 3-methyl-1,3-oxazolidin-2-one, and 3-ethyl-1,3-oxazolidin-2-one), amides (e.g., N-methylformamide, N,N-dimethylformamide, and N-methylacetamide), ethers (e.g., methylal, 1,2-dimethoxyethane, 1-ethoxy-2-methoxyethane, and 1,2-diethoxyethane), nitryls (e.g., acetonitrile, and 3-methoxypropionitrile), furans (e.g., 2,5-dimethoxytetrahydrofuran), 2-imidazolidinones (e.g., 1,3-dimethyl-2-imidazolidinone), or carbonate solvents other than a propylene carbonate (e.g., ethylene carbonate).

A single sub-solvent can be used alone, or two or more sub-solvents can be used in combination. Preferably, with respect to 100 parts by weight of γ-butyrolactone and/or propylene carbonate, about 0 to about 40 parts by weight of sub-solvent is used. An excessive amount of sub-solvent is likely to reduce the electrochemical stability of the electrolytic solution. The reduced stability may promote the increase in the internal pressure of the electrochemical device when a voltage is applied, resulting in less satisfactory performance of the device.

The electrolytic solution used in the electrochemical device of the present invention contains a quaternary salt of a compound having an alkyl-substituted amidine group as an electrolyte. The quaternary salt is preferably an electrochemically stable compound which includes an organic carboxylic acid salt or an inorganic acid salt. Preferred organic carboxylic acids include maleic acid, phthalic acid, benzoic acid and adipic acid. Preferred inorganic acids include perchloric acid, tetrafluoroboric acid, hexafluorophosphoric acid and fluoromethanesulfonic acid. The use of such organic carboxylic acid salts and/or inorganic acid salts as an electrolyte is preferable because it reduces the amount of gas generated by the hydroxide ions produced by an applied voltage. The reduced gas generation suppresses the increase in the internal pressure of the electrochemical device.

More preferably, the quaternary salt of a compound having an alkyl-substituted amidine group is a salt of a cyclic compound containing the N–C=N skeleton as part of the ring structure. Even more preferably, the quaternary salt is a salt of an alicyclic amidine compound, an imidazole compound or a benzimidazole compound, which are substituted with one or more alkyl or arylalkyl groups and are quaternarized. The alicyclic compound includes aliphatic bicyclic amidine compounds having the skeleton of bicyclononane, bicyclodecane or bicycloundecane, as well as an imidazoline compound and a pyrimidine compound. Such a compound is preferably substituted with one or more alkyl groups. The total number of carbon atoms in the substituent(s) is preferably about 1 to about 20, and more preferably about 1 to about 15. A salt of such a compound is preferred because it quickly consumes the hydroxide ions produced in the electrolytic solution and thus prevents the electrolytic solution from leaking.

Preferred aliphatic bicyclic amidine compounds include 8-methyl-1,8-diazabicyclo[5,4,0]undec-7-enium, and 5-methyl-1,5-diazabicyclo[4,3,0]non-5-enium. Preferred imidazoline compounds include 1,2,3-trimethylimidazolinium, 1,2,3,4-tetramethylimidazolinium, 1,2-dimethyl-3-ethylimidazolinium, 1,3,4-trimethyl-2-ethylimidazolinium, 1,3-dimethyl-2-heptylimidazolinium, 1,3-dimethyl-2-(1'-ethylpentyl)imidazolinium, and 1,3-dimethyl-2-dodecylimidazolinium. Preferred pyrimidine compounds include 1,2,3-trimethyl-1,4,5,6-tetrahydropyrimidinium. Preferred imidazole compounds include 1,3-dimethylimidazolium, and 1-methyl-3-ethylimidazolium. Preferred benzimidazole compounds include 1,3-dimethylbenzimidazolium.

The salt of a compound having an alkyl-substituted amidine group is contained in the electrolytic solution in the amount of preferably about 5 to about 100 parts by weight, more preferably about 10 to about 50 parts by weight, and even more preferably about 20 to about 40 parts by weight, with respect to 100 parts by weight of γ-butyrolactone and/or propylene carbonate.

Preferably, the water content in the main body is less than about 10% based on the weight of the impregnated electrolytic solution. When the water content is about 10% or more, the electrolysis reaction may be promoted to an extent where the increase in the internal pressure of the electrochemical device adversely affects its performance.

Any one or more of various additives can be appropriately mixed as necessary in the electrolytic solution used in the electrochemical device of the present invention. Preferred additives include: a phosphorus compound such as phosphoric acid and a phosphate ester; a borate compound such as boric acid, a complex compound of a boric acid and a polysaccharide (e.g., mannitol, sorbitol), and a complex compound of a boric acid and a polyalcohol (e.g., ethylene glycol, glycerin); and a nitro compound such as o-nitrobenzoic acid, m-nitrobenzoic acid, p-nitrobenzoic acid, o-nitrophenol, m-nitrophenol, p-nitrophenol and p-nitro-acetophenone.

Particularly in the case of an aluminum electrolytic capacitor, when such an additive is mixed, an aluminum oxide film formed on the surface of the aluminum case which is in contact with the electrolytic solution can be easily formed. As a result, it is possible to suppress the electrolytic reaction of the electrolytic solution, thereby further retarding the deterioration of the seal.

The seal used in the electrochemical device of the present invention is an elastic body obtained by adding an alkylphenol formalin resin as a vulcanizing agent to a butyl rubber polymer which is a copolymer of isobutylene and isoprene. Any copolymer of isobutylene and isoprene can be used as the butyl rubber polymer. The copolymer may contain a small amount of other comonomers so long as the characteristics of the copolymer as a butyl rubber polymer are not substantially affected.

An alkylphenol formalin resin is a resin which is produced through a condensation reaction of metacresol and/or xylenol, or the like, with formalin. Various alkylphenol formalin resins with various properties may be produced depending upon the type and concentration of catalyst used in the production, the molar ratio between the formalin and the alkylphenol, and the reaction conditions. Preferably about 1 to about 20 parts by weight, and more preferably about 3 to about 10 parts by weight, of such an alkylphenol formalin resin is added with respect to 100 weigh parts of the butyl rubber polymer. Other components such as carbon and inorganic filler can further be blended as necessary. When an elastic body is obtained by vulcanizing the butyl rubber polymer with a vulcanizing agent other than an alkylphenol formalin resin, the rubber elasticity thereof may deteriorate significantly under high temperature and high humidity conditions. As a result, a sufficient sealing property is unlikely to be obtained.

At least a portion of the above-described seal has a hardness of about 75 IRHD or greater. The phrase "hardness of at least a portion of the seal" as used herein refers to the hardness of the seal which is measured at least one of: on a portion of the surface of the seal to be in contact with the main body and between two holes thereof through which a pair of lead wires pass; and on an inner surface of the hole to be in contact with the lead wire.

Preferably, substantially the entire seal has a hardness of about 75 IRHD or greater. More preferably, no part of the seal has a hardness of less than about 73 IRHD. The hardness of the seal can be set to any desired value by appropriately determining the amount of the vulcanizing agent to be added, the molding temperature, etc. The seal having a hardness of less than about 75 IRHD is not preferably used in the present invention because such a seal may not ensure a sufficient sealing force for compressing the lead wires, and it is likely to result in leakage of the electrolytic solution under high temperature and high humidity conditions.

The lead wire used in the electrochemical device of the present invention may be one whose rod-like terminal section has been subjected to a corrosion prevention treatment. When subjected to the corrosion prevention treatment, it is possible to suppress generation of a current and thereby to reduce the electrolysis. Thus, it is possible to reduce the influence of the electrolysis, thereby improving the sealing property of the device.

While the corrosion prevention treatment is preferably performed for both of an anode terminal section and a cathode terminal section, it may alternatively be performed for only one of the terminal sections.

Preferred and simple methods for the corrosion prevention treatment include anodization in an aqueous solution, application of a metal alkoxide followed by sintering, and application of a metallized colloidal solution (e.g., a colloidal solution of silicon dioxide and titanium dioxide) followed by sintering.

Any suitable material may be used for components of the main body including the anode foil, the cathode foil, the separator and the lead wire as well as the case and the cover.

Examples of the electrochemical device of the present invention will now be described. However, the present invention is not limited to such specific examples. The term "part(s)" as used hereinafter refers to "part(s) by weight".

Production of Electrolytic Solutions A to K:

Compositions for use in electrolytic solutions A to K of this example are listed below. Each of the electrolytic solutions A to K was produced by mixing and dissolving the respective compounds.

Electrolytic Solution A:
γ-butyrolactone (100 parts)
mono 8-methyl-1,8-diazabicyclo[5,4,0]undec-7-enium phthalate (30 parts)
p-nitrobenzoic acid (1 part)

Electrolytic Solution B:
γ-butyrolactone (100 parts)
mono 5-methyl-1,5-diazabicyclo[4,3,0]non-5-enium phthalate (30 parts)
monobutyl phosphate (1 part)
p-nitrophenol (1 part)

Electrolytic Solution C:
γ-butyrolactone (100 parts)
mono 1,2,3-trimethylimidazolinium phthalate (30 parts)
p-nitrobenzoic acid (1 part)
p-nitrophenol (1 part)

Electrolytic Solution D:
γ-butyrolactone (100 parts)
mono 1,2,3,4-tetramethylimidazolinium phthalate (30 parts)
o-nitrobenzoic acid (1 part)
monobutyl phosphate ester (1 part)

Electrolytic Solution E:
γ-butyrolactone (90 parts)
ethylene glycol (10 parts)
mono 1,2-dimethyl-3-ethylimidazolinium maleate (30 parts)
o-nitrophenol (1 part)

Electrolytic solution F:
γ-butyrolactone (100 parts)
mono 1,2,3-trimethylimidazolinium phthalate (30 parts)
boric acid (1 part)
mannitol (2 parts)
p-nitrobenzoic acid (0.5 part)
phosphoric acid (0.25 part)
monobutyl phosphate ester (0.25 part)

Electrolytic Solution G:
γ-butyrolactone (100 parts)
mono 1,3-dimethyl-2-heptylimidazolinium phthalate (30 parts)
boric acid (1 part)
glycerin (2 parts)

Electrolytic Solution H:
γ-butyrolactone (100 parts)
mono 1,3-dimethyl-2-(1'-ethylpentyl)imidazolinium phthalate (30 parts)
p-nitroanisole (1 part)

Electrolytic Solution I:
γ-butyrolactone (100 parts)
mono 1,2,3-trimethyl-1,4,5,6-tetrahydro-pyrimidinium phthalate (30 parts)
p-nitrobenzoic acid (1 part)

Electrolytic Solution J:
propylene carbonate (100 parts)
tetrafluoroboric acid 1-methyl-3-ethylimidazolium (30 parts)

Electrolytic Solution K:
γ-butyrolactone (100 parts)
mono tetramethylammonium phthalate (30 parts)
p-nitrobenzoic acid (1 part)

Production of Elastic Bodies X to Z:

Butyl rubber elastic bodies X to Z used as the seal in the examples were molded as described below. The hardness of each of the molded seals was measured at two locations: (1) on a portion of the surface of the member to be in contact with the capacitor element and between two holes thereof through which a pair of lead wires pass; and (2) on the inner surface of the hole in contact with the lead wire (Measurement temperature=25±1° C.).

Elastic Body X (Resin Vulcanization; Hardness of About 75 IRHD or Greater):

Elastic body X was produced by a vulcanization molding process by adding 2 parts of an alkylphenol formalin resin, as a vulcanizing agent to 30 parts of a copolymer of isobutylene and isoprene, 20 parts of carbon and 50 parts of an inorganic filler. The hardness measurements were about 77 IRHD at the location (1) and about 76 IRHD at the location (2).

Elastic Body Y (Resin Vulcanization; Hardness of Less Than About 75 IRHD):

Elastic body Y was produced by a vulcanization molding process by adding 2 parts of an alkylphenol formalin resin as a vulcanizing agent to 40 parts of a copolymer of isobutylene and isoprene, 20 parts of carbon and 40 parts of inorganic filler. The temperature during the vulcanization molding process was set to be lower than that when producing the elastic body X. The hardness measurements were about 74 IRHD at the location (1) and about 72 IRHD at the location (2).

Elastic Body Z (Sulfur Vulcanization; Hardness of About 75 IRHD or Greater):

Elastic body Z was produced by a vulcanization molding process by adding 2 parts of sulfur as a vulcanizing agent to 30 parts of a copolymer of isobutylene and isoprene, 20 parts of carbon and 50 parts of inorganic filler. The hardness measurements were about 78 IRHD at the location (1) and about 77 IRHD at the location (2).

EXAMPLE 1

An aluminum electrolytic capacitor was produced as an example of the electrochemical device illustrated in FIG. 1. The anode and cathode foils 2 and 3 (made of an aluminum foil) and the separator 4 (made of a Manila fiber) between the foils 2 and 3 were rolled up. The electrolytic solution A was impregnated in the obtained structure, thereby obtaining the capacitor element 1 as the main body (rated voltage: about 35 V; electrostatic capacity: about 2200 $\mu$F). The lead wires 5a and 5b were coupled to the anode foil 2 and the cathode foil 3, respectively. A corrosion prevention treatment was performed for the lead wire 5b, before it was connected to the cathode foil 3, by providing the lead wire 5b with an oxide film through a chemical treatment under low voltage conditions (about 200 V) in a boric acid solution. The capacitor element 1 and the elastic body X as the seal 7 were placed in the metallic case 6 made of aluminum, and the opening was sealed by curling. The resultant structure was covered by the cover 8, thereby producing the aluminum electrolytic capacitor (electrochemical device) 10.

EXAMPLE 2

Example 2 is similar to Example 1 except that electrolytic solution B was used instead of electrolytic solution A.

EXAMPLE 3

Example 3 is similar to Example 1 except that electrolytic solution C was used instead of electrolytic solution A.

EXAMPLE 4

Example 4 is similar to Example 1 except that electrolytic solution D was used instead of electrolytic solution A.

EXAMPLE 5

Example 5 is similar to Example 1 except that electrolytic solution E was used instead of electrolytic solution A.

EXAMPLE 6

Example 6 is similar to Example 1 except that electrolytic solution F was used instead of electrolytic solution A.

EXAMPLE 7

Example 7 is similar to Example 1 except that electrolytic solution G was used instead of electrolytic solution A.

EXAMPLE 8

Example 8 is similar to Example 1 except that electrolytic solution H was used instead of electrolytic solution A.

EXAMPLE 9

Example 9 is similar to Example 1 except that electrolytic solution I was used instead of electrolytic solution A.

EXAMPLE 10

An electric double layer capacitor was produced as another example of the electrochemical device illustrated in FIG. 1. The anode and cathode foils 2 and 3 (an activated carbon applied on the surfaces thereof) and the separator 4 (made of a porous polypropylene resin) between the foils 2 and 3 were rolled up. The electrolytic solution J was impregnated in the obtained structure, thereby obtaining the capacitor element 1 as the main body (rated voltage: about 2.5 V; electrostatic capacity: about 30 $\mu$F). The lead wires 5a and 5b were coupled to the anode foil 2 and the cathode foil 3, respectively. A corrosion prevention treatment was performed for the lead wire 5b, before being connected to the cathode foil 3, by providing the lead wire 5b with an oxide film through a chemical treatment under low voltage conditions (about 200 V) in a boric acid solution. The capacitor element 1 and the elastic body X as the seal 7 were placed in the metallic case 6 made of aluminum, and the opening was sealed by curling. The resultant structure was covered by the cover 8, thereby producing the electric double layer capacitor (electrochemical device) 10.

Comparative Example 1

Comparative Example 1 is similar to Example 1 except that electrolytic solution K was used instead of electrolytic solution A.

Comparative Example 2

Comparative Example 2 is similar to Example 1 except that elastic body Y was used instead of elastic body x.

Comparative Example 3

Comparative Example 3 is similar to Example 1 except that elastic body Z was used instead of elastic body X.

Twenty electrochemical devices were produced for each of the examples and the comparative examples above. A leakage test was conducted for each electrochemical device while applying a reverse voltage of about −2.0 V for about 2000 hours under two conditions: (1) a high temperature condition at a temperature of about 110° C.; and (2) a high temperature and high humidity condition at a temperature of about 85° C. and a relative humidity of about 85%. The results are shown in Table 1 below.

TABLE 1

Leakage test results* (after 2000 hours)

| | Electrolytic solution | Elastic body (seal) | Temperature 110° C. | Temperature 85° C. Relative humidity 85% |
|---|---|---|---|---|
| | | | Number of electrochemical devices with leakage | |
| Example 1 | A | X | 0 | 0 |
| Example 2 | B | X | 0 | 0 |
| Example 3 | c | X | 0 | 0 |
| Example 4 | D | X | 0 | 0 |
| Example 5 | E | X | 0 | 0 |
| Example 6 | F | X | 0 | 0 |
| Example 7 | G | X | 0 | 0 |
| Example 8 | H | X | 0 | 0 |
| Example 9 | I | X | 0 | 0 |
| Example 10 | J | X | 0 | 0 |
| Comparative Example 1 | K | X | 7 | 20 |
| Comparative Example 2 | A | Y | 0 | 4 |
| Comparative Example 3 | A | Z | 4 | 8 |

*20 devices were tested for each example

As compared with the aluminum electrolytic capacitors of Comparative Examples 1 to 3, the aluminum electrolytic capacitors of Examples 1 to 9 of the present invention were shown to be more effective in suppressing leakage in the presence of an applied voltage; no leakage was observed after 2000 hours even under high temperature and high humidity conditions (i.e., at a temperature of about 85° C. and a relative humidity of about 85%). Similarly, no leakage was observed in the electric double layer capacitor of Example 10 of the present invention.

Comparative Example 1 employed the electrolytic solution K which is easily denatured by alkalis because it contains a quaternary ammonium salt as an electrolyte. Also employed was the seal X having a hardness of about 75 IRHD or greater which is produced by molding a butyl rubber polymer with an alkylphenol formalin resin added thereto as a vulcanizing agent. In Comparative Example 1, the deterioration of the seal by alkalis was significant, whereby leakage was not well suppressed.

Comparative Example 2 employs the electrolytic solution A containing a quaternary salt of a compound having an alkyl-substituted amidine group as an electrolyte, and the seal Y having a hardness of less than about 75 IRHD which is produced by molding a butyl rubber polymer with an alkylphenol formalin resin added thereto as a vulcanizing agent. In Comparative Example 2, no leakage was observed under the high temperature condition (i.e., temperature: 110° C.), but leakage was not completely prevented under the more severe condition (i.e., temperature: 85° C.; relative humidity: 85%).

Comparative Example 3 employs the electrolytic solution A containing a quaternary salt of a compound having an alkyl-substituted amidine group as an electrolyte, and the seal Z having a hardness of about 75 IRHD or greater which is produced by molding a butyl rubber polymer with a vulcanizing agent other than an alkylphenol formalin resin added thereto. In Comparative Example 3, leakage was not completely prevented.

An electrochemical device with a reliable sealing property which is unlikely to have any leakage even under high temperature and high humidity conditions is obtained from a combination of an electrolytic solution containing a quaternary salt of a compound having an alkyl-substituted amidine group, and a seal having a hardness of about 75 IRHD or greater which is produced by molding a butyl rubber polymer with an alkylphenol formalin resin.

As described above, according to the present invention, it is possible to obtain an electrochemical device with reduced influence of an increase in the internal pressure and deterioration of the seal by alkalis due to electrolysis of the electrolytic solution. Furthermore, stability of the seal of the device under high temperature and high humidity conditions can be improved. Thus, there is provided an electrochemical device in which leakage of the electrolytic solution is effectively prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electrochemical device, comprising:
   a main body formed by rolling up an anode foil, a cathode foil and a separator disposed therebetween, each of the anode foil and the cathode foil having a lead wire connected thereto, wherein the main body is impregnated with an electrolytic solution;
   a tubular case having a bottom surface for accommodating the main body; and
   a seal for sealing an opening of the tubular case, which includes a through hole for the lead wire to pass therethrough, wherein:
   the electrolytic solution contains about 5 to about 100 parts by weight of a quaternary salt of a compound having an alkyl-substituted amidine group as an electrolyte with respect to 100 parts by weight of an organic solvent containing at least one of γ-butyrolactone and propylene carbonate;
   the seal is an elastic body containing a butyl rubber polymer which is a copolymer of isobutylene and isoprene, and an alkylphenol formalin resin as a vulcanizing agent; and
   at least a portion of the seal has a hardness of about 75 International Rubber Hardness Degrees.

2. An electrochemical device according to claim 1, wherein the quaternary salt is selected from the group consisting of an alicyclic amidine compound, an imidazole compound and a benzimidazole compound, which are substituted with one or more alkyl or arylalkyl groups and quaternarized.

3. An electrochemical device according to claim 1, wherein the quaternary salt is selected from the group consisting of 8-methyl-1,8-diazabicyclo[5,4,0)]undec-7-enium, 5-methyl-1,5-diazabicyclo[4,3,0]non-5-enium, 1,2,3-trimethylimidazolinium, 1,2,3,4-tetramethylimidazolinium, 1,2-dimethyl-3-ethylimidazolinium, 1,3,4-trimethyl-2-ethylimidazolinium, 1,3-dimethyl-2-heptylimidazolinium, 1,3-dimethyl-2-(1'-ethylpentyl-)imidazolinium, 1,3-dimethyl-2-dodecylimidazolinium, 1,2,3-trimethyl-1,4,5,6-tetrahydropyrimidinium, 1,3-dimethylimidazolium, 1-methyl-3-ethylimidazolium and 1,3-dimethylbenzimidazolium.

\* \* \* \* \*

UNITED STATES PATENT AND TRADEMARK OFFICE
CERTIFICATE OF CORRECTION

PATENT NO.   : 6,198,622 B1
DATED        : March 6, 2001
INVENTOR(S)  : Nitta et al.

It is certified that error appears in the above-identified patent and that said Letters Patent is hereby corrected as shown below:

<u>Title page,</u>
Item [56] References Cited, U.S. PATENT DOCUMENTS: "Ohvachi et al." should read -- Ohyachi --.

<u>Column 13, claim 3,</u>
Line 3, "[5,4,0)]" should read -- [5,4,0] --.

Signed and Sealed this

Twelfth Day of March, 2002

*Attest:*

JAMES E. ROGAN
*Attesting Officer*   *Director of the United States Patent and Trademark Office*